Oct. 26, 1943.  E. G. ROEHM  2,332,532
DUAL PATTERN CONTROLLED MACHINE TOOL
Filed Oct. 3, 1940  5 Sheets-Sheet 1

INVENTOR.
ERWIN G. ROEHM
BY
A. H. Parsons
ATTORNEY.

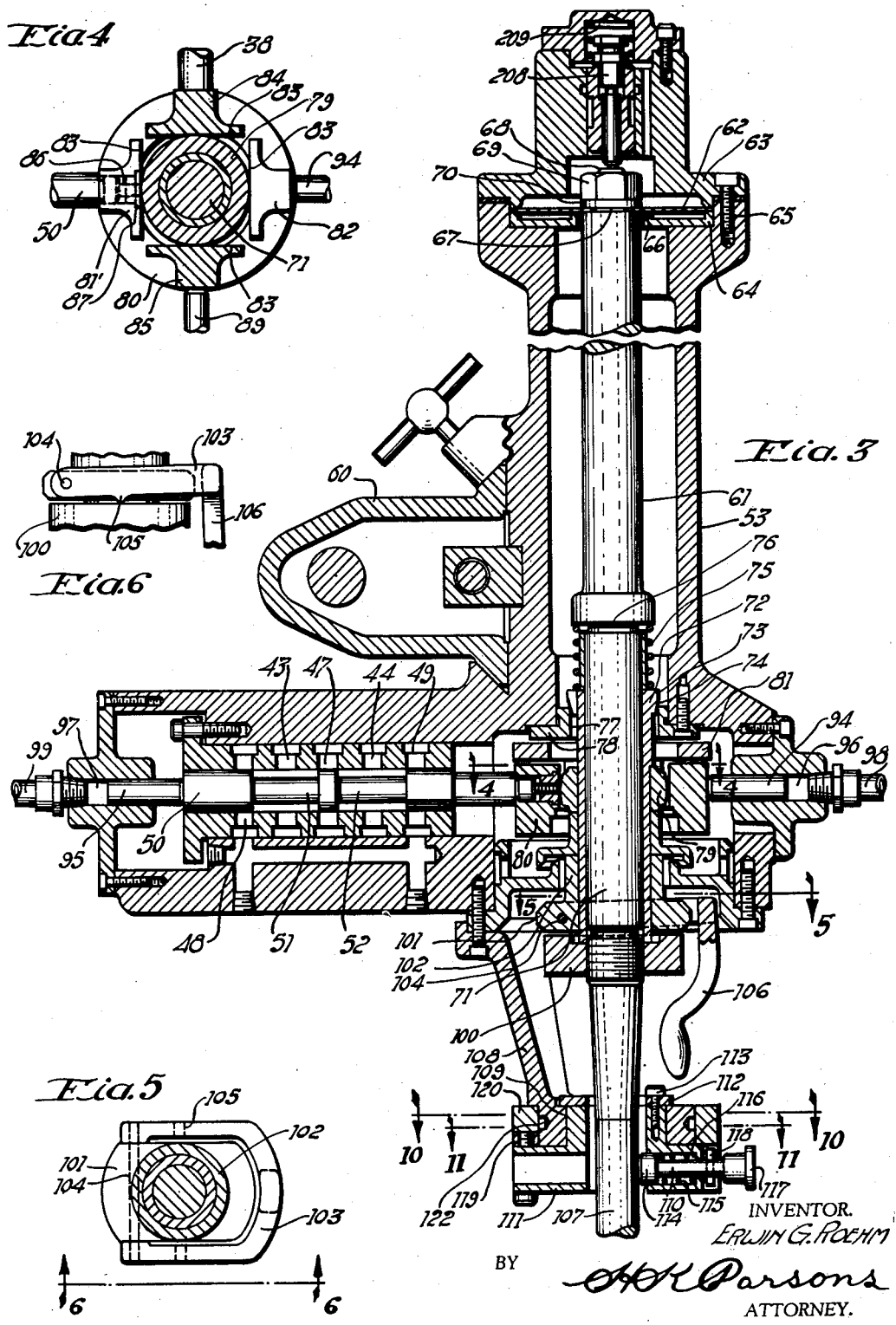

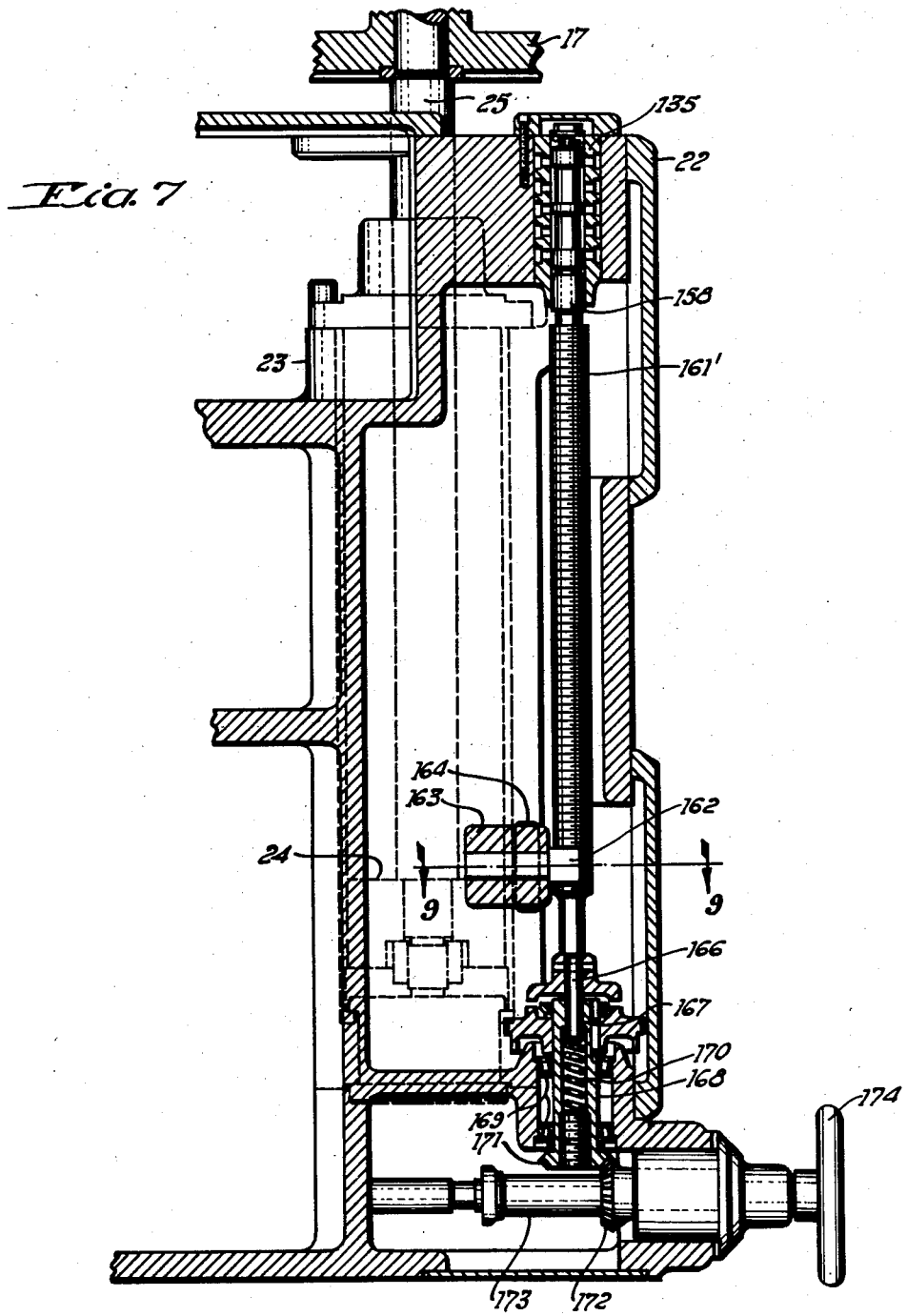

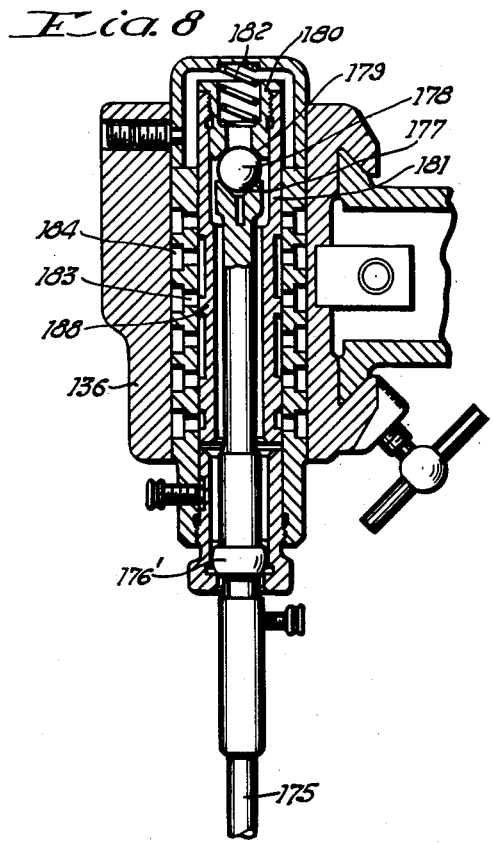
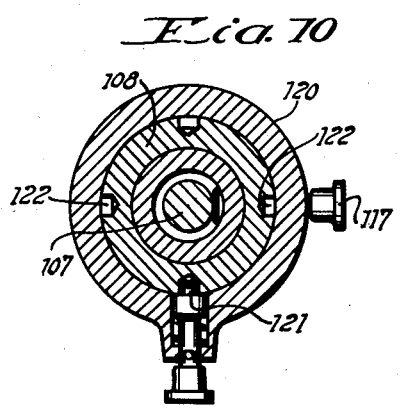
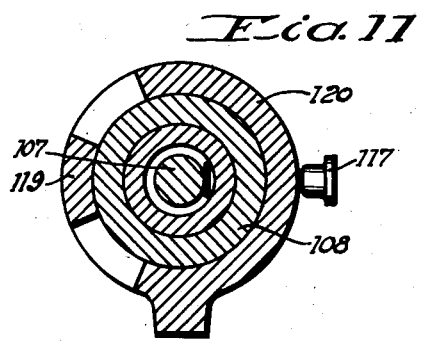
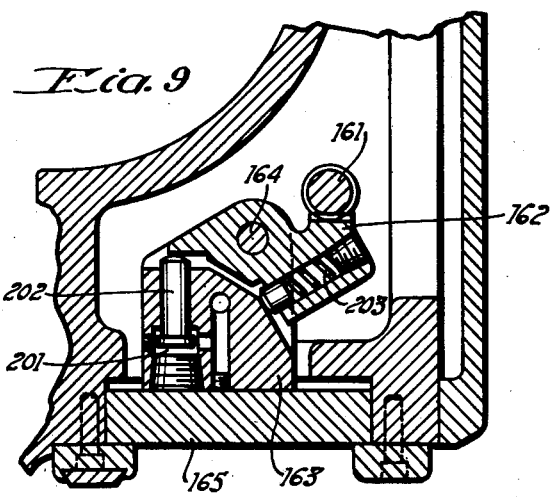

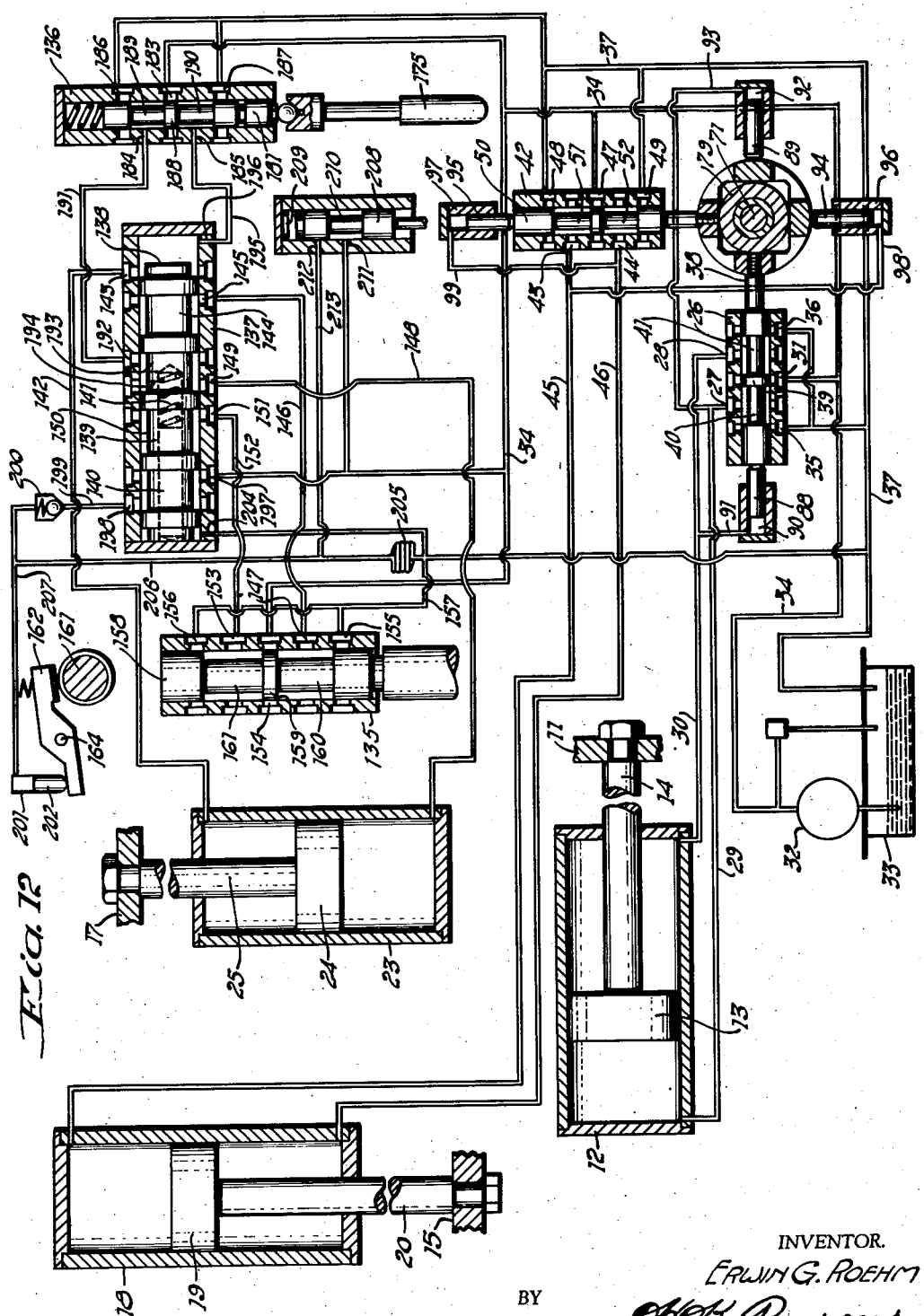

Patented Oct. 26, 1943

2,332,532

UNITED STATES PATENT OFFICE 2,332,532

DUAL PATTERN CONTROLLED MACHINE TOOL

Erwin G. Roehm, Norwood, Ohio, assignor to The Cincinnati Milling Machine Co., Cincinnati, Ohio, a corporation of Ohio Application October 3, 1940, Serial No. 359,579

21 Claims. (Cl. 90—13.5)

This invention relates to pattern controlled machine tools such as milling machines and the like.

One of the objects of this invention is to provide a new and improved duplex pattern controlled milling machine.

Another object of this invention is to provide in a die-sinking machine improved and simplified means for obtaining simultaneous three-directional control of relative movement between a cutter and work piece whereby automatic control of depth may be obtained during any direction of feed.

A further object of this invention is to provide a new and improved tracer control mechanism for a pattern controlled machine tool.

An additional object of this invention is to provide improved means for increasing the rate of relative movement between the cutter and work without interfering with the tracer action.

Other objects and advantages of the present invention should be readily apparent by reference to the following specification, considered in conjunction with the accompanying drawings forming a part thereof and it is to be understood that any modifications may be made in the exact structural details there shown and described, within the scope of the appended claims, without departing from or exceeding the spirit of the invention.

Referring to the drawings in which like reference numerals indicate like or similar parts:

Figure 3 is an enlarged section through the feed directional control tracer as viewed on the line 3—3 of Figure 1.

Figure 4 is a detail section on the line 4—4 of Figure 3.

Figure 5 is a detail section on the line 5—5 of Figure 3.

Figure 6 is a view in elevation of the rapid traverse control lever as viewed on the line 6—6 of Figure 5.

Figure 7 is an elevational view partly in section of the elevating control mechanism.

Figure 8 is an enlarged section through the vertical tracer control, as viewed on the line 8—8 of Figure 1.

Figure 9 is a detail section on the line 9—9 of Figure 7.

Figure 10 is a section on the line 10—10 of Figure 3.

Figure 11 is a section on the line 11—11 of Figure 3.

Figure 12 is a diagrammatic view of the hydraulic control circuit.

Figure 1:
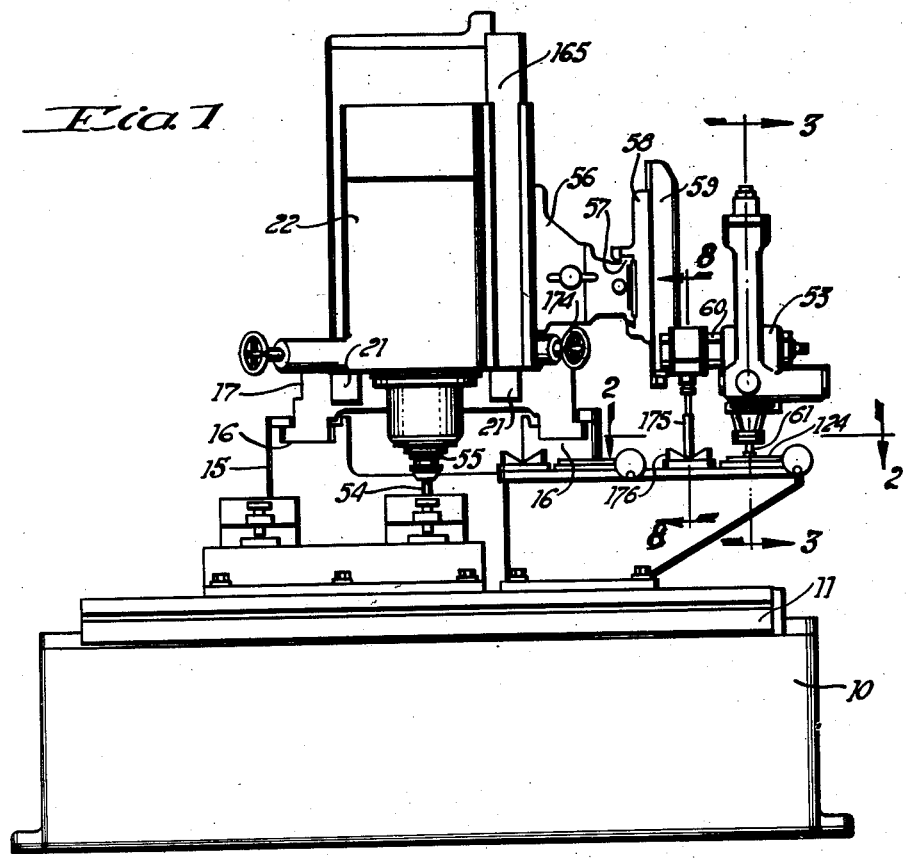
Figure 1 is a view in elevation of a machine embodying the principles of this invention.

Referring to Figure 1 of the drawings the reference numeral 10 indicates the bed of a machine embodying the principles of this invention. A table 11 is supported by suitable guideways for reciprocation upon the top of the bed and this movement may be effected by a hydraulic motor of the piston and cylinder type which, as shown in Figure 12, comprises a cylinder 12, a piston 13 and a piston rod 14, the latter serving to connect the piston 13 to one end of the table 11.

A column 15 uprises from the rear of the bed and is provided with spaced guideways 16 upon which reciprocates a cross slide or carrier 17. This cross slide is adapted to be actuated by a hydraulic motor of the piston and cylinder type which, as shown in Figure 12, comprises a cylinder 18, a piston 19 and a piston rod 20, the piston rod serving to connect the piston 19 to the column 15 whereby the cylinder is the moving element. The cross slide is provided with vertical guideways 21 for receiving a vertically movable carrier 22. This carrier is also actuated by a hydraulic motor of the piston and cylinder type which, as shown in Figure 12, comprises the cylinder 23, piston 24, and the piston rod 25 connecting the piston to the carrier 17 whereby the cylinder is the moving element.

Hydraulic actuation of the table piston 13 is controlled by a reversing valve 26, which has two ports 27 and 28 connected by channels 29 and 30 to the respective ends of the cylinder 12. This valve also has a pressure port 31 which is supplied by a pump 32 from reservoir 33 through channel 34. The exhaust ports 35 and 36 of this valve are connected by a channel 37 to the reservoir 33.

A shiftable plunger 38 having a central spool 39, and annular grooves 40 and 41 on opposite sides thereof, serve to alternately connect the pressure port 31 to ports 27 or 28, and connect the remaining port to one of the exhaust ports to effect reversible movement of the table. Hydraulic actuation of the cross slide is controlled by a second reversing valve 42 which has a pair of ports 43 and 44 which are connected by channels 45 and 46 to opposite ends of the cylinder 18. This valve also has a pressure port 47 which is supplied from channel 34 and a pair of exhaust ports 48 and 49 which are connected to the return channel 37.

A shiftable plunger, having spaced annular grooves 51 and 52, serves to connect the pressure port 47 alternately to the ports 43 and 44, while connecting the remaining port to one of the exhaust ports 48, 49.

The valves 26 and 42 are mounted in the tracer housing 53 and at right angles to one another and parallel to the axis of movement of the respective slides which they control. The plungers of these valves are connected to a tracer in such manner that deflection of the tracer in any given direction radially to the axis thereof will cause relative movement between the cutter and work in that direction.

The cutter 54 is attached to a vertical spindle 55 which is rotatably journaled in the vertical slide 22, suitable means not shown being provided for power rotating the spindle. Since the vertical slide 22 is carried by the cross slide 17, the tracer housing 53 which is mounted on the vertical slide 22 is responsive to movements of both of these slides.

The vertical slide has a laterally projecting bracket 56 upon which is formed a guideway 57 extending parallel to the direction of cross slide movement. A sub-support 58 is mounted on the guideway 57, and in turn supports a vertically movable slide 59 which constitutes a carrier for the tracer housing 53. The slide 59 has a horizontal guide 60 integrally formed therewith and the tracer housing 53 is adjustably mounted on this guideway. By means of this combination of parts it is possible to effect three directional adjustment of the tracer housing relative to the cutter 54 for initial set-up purposes.

The manner of connecting the valve plungers 38 and 50 to the tracer is more particularly shown in Figures 3 and 4. Referring to Figure 3, a pendulum tracer 61 is supported at its upper end within the tracer housing 53 by means of a flexible diaphragm 62 which has its outer rim clamped between members 63 and 64 by screws 65.

The member 64 also provides an annular surface 66 which engages the underside of the diaphragm adjacent to the periphery of the tracer. The upper end of the tracer is reduced to form a shoulder 67 and a reduced threaded shank 68 which passes through a central hole in the diaphragm so that the diaphragm engages the shoulder 67. A threaded nut 69 and washer 70 serve to clamp the center portion of the diaphragm to the tracer. The diaphragm has sufficient flexibility so that the tracer may be deflected laterally at its lower end while the annular surface 66 holds the tracer against downward axial movement but does not prevent upward movement.

The tracer has a cylindrical portion 71 upon which is mounted a sleeve 72 having an enlarged end 73 upon which is formed an external tapered surface 74. A spring 75 is interposed between the enlarged end of the sleeve and a shoulder 76 formed on the tracer for exerting a continuous axial urge on the sleeve in a direction to force the tapered surface 74 into the bore 77 of an annular ring 78. This ring is attached to the inside of the tracer housing with the bore 77 in concentric relation to the normal position of the tracer axis when freely suspended by the diaphragm whereby the pressure on the sleeve acts to centralize the tracer. When the tracer is thus centralized the two valve plungers are centralized in a stop position and connected to the tracer so that no movement of either the table or cross slide will occur while the tracer is centralized.

The sleeve 72 carries an annular ring 79 and around this ring are positioned two Scotch yokes 80 and 81. As shown in Figure 4, the Scotch yoke 80 has two upstanding integral ears 81' and 82 which are provided with flat faces 83 for engaging opposite sides of the ring 79. The Scotch yoke 81 has two integral downwardly projecting ears 84 and 85 which are also provided with flat faces 83 for engaging opposite sides of the ring 79. It will be noted that the ears on one yoke are spaced 180 degrees apart and also 90 degrees apart with respect to the ears on the other yoke. The valve plunger 50 is connected to the upstanding ear 81' by means of a threaded connection 86 to an insert 87 counterseated in the face 83. The same type of connection is provided for connecting the plunger 38 to the downwardly extending ear 84.

Since there is no lost motion in these connections it will be apparent that lateral movement of the tracer in any direction will produce a component or components of movement of the two valve plungers and cause a shifting thereof in a direction that will cause power movement of one or both slides.

In order to insure that the slides do not creep due to any slight leakage in the valves, means are provided which will produce a counter or opposing movement that will effect a sufficient minute shifting of the valve plunger in the proper direction to stop the movement. In other words, each plunger is provided with a pair of fluid operable pistons located adjacent opposite ends of the plunger. As shown in Figure 12, the plunger 38 is provided with centralizing pistons 88 and 89, the cylinder 90, containing piston 88, being connected by conduit 91 to channel 30, and the cylinder 92, containing piston 89, being connected by conduit 93 to channel 29.

Thus, should the pressure rise in channel 30 above the pressure in channel 29 due to the spool 39 of valve plunger 38 being slightly to the left as viewed in Figure 12, this slight increase in pressure would be communicated to the centralizing piston 88 and being slightly greater than the pressure communicated to piston 89 through branch 93 from channel 29 a slight movement would be imparted to the plunger toward the right until the pressures in both channels 29 and 30 are equalized. When this occurs the pressures on the centralizing pistons 88 and 89 would be equalized and further shifting of the valve plunger 38 would cease.

The valve plunger 50 is also provided with a pair of centralizing pistons 94 and 95 which are slidable in cylinders 96 and 97 respectively and connected by channels 98 and 99 to channels 45 and 46. Thus, if the plunger 50 shifts off center, the pressure would rise in channel 45 and cause the piston 94 to urge the valve plunger 50 back to a central position. Should the pressure rise in channel 46, the piston 95 would urge the plunger back to a central position.

A feed adjusting nut 100 is threaded on the tracer as shown in Figure 3 for engagement with the lower end of the sleeve 72. By rotating the nut 100 the sleeve can be shifted axially to effect a predetermined clearance between the taper 73 and the centralizing ring 78, and the amount of this clearance determines the amount that the control valves may be shifted from a central position and thereby the rate of feed that will be imparted to the connected slides.

In addition to the feed control, the tracer also carries means for imparting a rapid traverse movement to the slides without disturbing the setting of the feed control. This is accomplished by mounting on the sleeve 72 a support 101 which has a tubular portion 102 by which it is fitted to the sleeve. A U-shaped rapid traverse control lever 103 which is more particularly shown in Figures 5 and 6 is pivotally connected to the support 101 by a pin 104. The lever 103 is provided with a pair of downward extending knife edges 105 which engage the top surface of the feed nut 100 at diametrically opposite points. The lever 103 has a handle 106 as shown in Figure 3 for rocking the lever about the knife edges as pivots whereby the opposite end of the lever is elevated to raise the support 101 and thereby the sleeve 72 to which it is attached, increasing the clearance between the taper 73 and the centralizing ring 78, whereby the valves may be moved a greater distance from their center position to increase the rate of movement of the connected slides.

It should now be evident that the operator by means of the hand grip 107 may deflect the tracer laterally in any direction to produce a cutting path in that direction. When following a pattern the operator maintains an urge in a direction at 45 degrees to the face of the pattern to produce two components, one of which is perpendicular to the fact of the pattern whereby a continuous urge is present to maintain the tracer in contact with the pattern and thus sensitive to undulations therein during the feeding movement.

The maintaining of this urge by the operator is rather tiresome and therefore mechanical means have been provided by this invention for producing such an urge. referring to Figure 3 a depending bracket 108 is attached to the underside of the tracer housing and the lower end of this bracket is provided with a bore 109, which is concentric to the normal axis of the tracer. A tracer deflecting plunger 110 is mounted in a carrier 111 which is journaled for rotation in the bore 109. A top plate 112, attached to the carrier by screws 113, serves to hold the carrier in the bore.

The plunger has an enlarged head 114 which is adapted to engage the side of the tracer and a spring 115 is interposed between the end of this head and the end of a bore 116 in which the plunger slides to exert the deflecting urge on the tracer. The end of the plunger is provided with a knob 117 by which the plunger may be retracted from engagement with the tracer and so rotated that a cross pin 118 located in the plunger may engage the exterior of the carrier and thus hold the plunger in a retracted position.

The tracer thus becomes free for manual manipulation. It will be obvious that by supporting the carrier 111 for rotation in the bracket 108, that the carrier may be rotated to change the direction of deflecting urge on the tracer. The amount of this rotation is, however, limited to 90 degrees by means of a stop block 119, Figure 11, which is attached to the carrier and rides in an arcuate groove located on the underside of an indexible ring 120 which determines the orientation of the arc of rotation of the plunger carrier. The indexible ring is provided with a locking pin 121, Figure 10, which is adapted to be inserted in any one of four equally spaced holes 122 formed in the periphery of the lower end of the bracket 108. Thus, the ring may be locked in any one of four different positions to limit the arcuate movement of the plunger carrier to any one of four quadrants.

The purpose of limiting the movement of the plunger carrier to 90 degrees is that at any time during a feeding movement the carrier may be rotated through an angle of 90 degrees, which will immediately change the direction of deflection of the tracer sufficiently to reverse the direction of feeding movement of the cutter.

Figure 2:
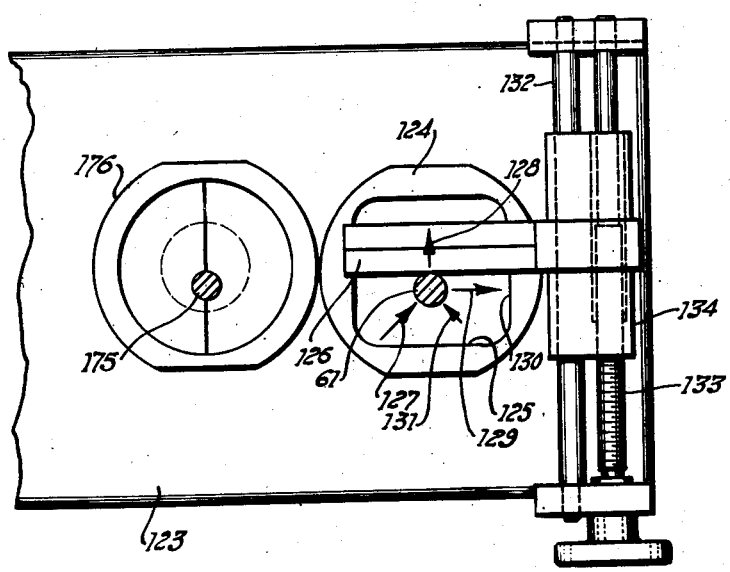
Figure 2 is a plan view of the duplex patterns as viewed on the line 2—2 of Figure 1.

As an example of how this deflector might be utilized, there is shown in Figure 2 a pattern carrier 123, upon which is mounted a pattern 124 having a cavity 125 formed therein. A sine bar 126 is superimposed over this cavity and the tracer 61 is adjusted in such position that it may engage the sine bar. By applying a directional urge by the plunger 114 in the direction of the arrow 127, the tracer will be urged in the direction of component 128 toward the face of the sine bar, as well as in the direction of a second component 129 whereby a feeding movement between the cutter and work will take place parallel to the direction of the arrow 129.

When the tracer reaches one end of the cavity, such as the wall 130 thereof, the operator rotates the carrier 111 through an angle of 90 degrees and thereby sets up a new directional urge in the direction of arrow 131 which will now produce a feeding movement in the opposite direction with respect to the arrow 129. The sine bar is supported for sliding movement on a supporting bar 132 and a lead screw 133 is threaded into the support 134 of the sine bar whereby rotation of the screw will effect a lateral shifting of the sine bar. Thus, by rotating the screw a predetermined amount simultaneously with rotation of the plunger carrier, the feeding direction of the cutter may not only be reversed but relatively shifted to create a new cutting path.

The tracer and cutter are carried by the vertical slide 22 which is moved hydraulically by the admittance of fluid pressure to one end or the other of cylinder 23. Two different means are provided for controlling this admittance of pressure, one of which is a manually controlled servo-valve 135, and the other, a tracer controlled valve 136. A selector valve 137 has a shiftable plunger 138, which determines the method of control.

The plunger 138 has an axial bore 139 in which is mounted a plunger 140 and a spring 141, the spring acting to normally position the valve plunger 138 in its right hand position. In this position the channel 142 from one end of cylinder 23 would be connected through port 143, annular groove 144 of valve plunger 138 and port 145 to channel 146 which leads to port 147 of the servo-valve 135. Channel 148 from the other end of cylinder 23 would be connected through port 149, annular groove 150 of valve plunger 138 and port 151 to channel 152 which leads to port 153 of the servo-valve 135.

The ports 147 and 153 of the servo-valve are located on opposite sides of a pressure port 154 which is directly connected to the pump 32. The servo-valve also has a pair of ports 155 and 156 located at opposite ends of the valve which are connected to a return line 157 which leads to the reservoir 33. The plunger 158 of this valve has a central spool 159 which normally closes the pressure port 154 and a pair of annular grooves 160 and 161 located on opposite sides thereof and of such dimension that when the central spool 159 closes the pressure port, the two exhaust ports 155 and 156 are also closed whereby there is no flow to the cylinder 23. A slight relative movement, however, of the plunger 158 in either direction will cause fluid to flow from the pump to one end of the cylinder 23, as well as flow from the other end of the cylinder to the return line.

The manual control means for the servo-valve are more particularly shown in Figure 7. It will be noted in this figure that the plunger 158 is integrally connected to a servo-screw 161' which, in turn, is operatively engaged by a threaded half-nut 162. The half-nut is pivotally connected to a bracket 163, Figure 9, by a pin 164 whereby the half-nut may be oscillated into or out of engagement with the servo-screw. The bracket 163 is mounted on the rear face of a vertical plate 165 which is attached at its upper end to the cross slide 17 whereby the plate 165 is fixed against vertical movement. It will be noted from Figure 7 that the valve housing 135 is mounted in the vertical slide 22 and therefore is subject to vertical movement.

The servo-screw 161' has a reduced lower end 166 which fits in a spline hole 167 formed in a rotor 168 which is supported by anti-friction bearings 169 in the slide 22. A spring 170 is also mounted within the rotor for exerting an axial thrust on the servo-screw to take up lost motion between the parts. The rotor 168 is provided with bevel gear teeth 171 which intermesh with a bevel gear 172 mounted on a shaft 173.

The hand wheel 174, attached to the outer end of shaft 173, serves as means for imparting manual rotation to the servo-screw 161'. It should now be evident that with the nut 162 fixed in place that rotation of the hand wheel 174 will cause axial movement of the servo-screw 161', thereby displacing the valve plunger 158 axially to open the various ports in the servo-valve. This will result in a relative movement between the piston 24 and the cylinder 23 whereby the slide 22 and valve housing 135, as well as the actuating mechanism for rotating the screw will be moved axially relative to the screw. Movement of the valve housing will close the pressure port and exhaust ports, thereby stopping the movement. Thus, the movement of the vertical slide will continue in either direction only so long as the hand wheel 174 is rotated, and as soon as rotation stops the servo-valve restores itself and thereby stops the slide.

The tracer valve 136, Figure 8, is provided with a tracer 175 which is adapted to engage a pattern 176 which may be suitably positioned on the table as shown in Figures 1 and 2. The pattern is provided with a suitably formed surface for automatically controlling the vertical movement of the vertical slide independently of the movements effected by the tracer 61 and regardless of the direction of those movements whereby simultaneous three-dimensional control of the cutter may be obtained.

One form of tracer valve mechanism for controlling the vertical movement automatically is shown in Figure 8 of the drawings. The tracer 175 is supported in the housing 136 by a ball and socket bearing 176' which permits universal lateral movement of the tracer. The upper end of the tracer arm is provided with a conical socket 177 in which is mounted a ball 178, the ball being interposed between the conical socket and spherical bearing 179 formed on the lower end of a sleeve 180 which is threaded in the end of the tubular valve member 181. A spring 182 exerts a continuous axial pressure on the valve member to seat the ball 178 and seat the tracer on its ball and socket bearing 176'. It will be obvious now that any lateral movement of the tracer will tend to cause the ball to lift and thereby effect an upward axial movement of the valve sleeve.

Referring to Figure 12, the tracer valve 136 is provided with a pressure port 183, a pair of motor ports 184 and 185 and a pair of exhaust ports 186 and 187. The valve plunger 181 is provided with a central spool 188 and a pair of annular grooves 189 and 190 on opposite sides thereof. The valve plunger is shown in Figure 8 in its lowest position, in which the spool 188 is displaced downward a sufficient amount to connect the pressure port 183 to the motor port 184. Fluid pressure will, therefore, flow through the channel 191 to port 192 of the selector valve 137. The port 192 is connected at all times by the annular groove 193 to the radial port 194 in plunger 138 which intercommunicates with axial bore 139. This applies hydraulic pressure, in addition to the spring pressure, to maintain the selector valve plunger 138 in its right hand position.

As the tracer valve 181 moves upward it tends to reduce the pressure differential between channel 191 and channel 195 which connects the pressure port 185 to port 196 located in the right hand end of the selector valve housing 137.

It will be noted that the end area of the valve plunger 138 is much larger than the end area of the plunger 140. Therefore, as the tracer valve spool 188 moves toward a central position with respect to port 183 but before it reaches that position a sufficient change in the unit pressures in channels 191 and 195 will be effected whereby the valve plunger 138 will be shifted into the position shown in Figure 12, thereby connecting port 192 to port 149, and port 196 to port 143. This will disconnect the manual servo-mechanism from control of the vertical cylinder and effect connection of the latter for control by the tracer valve.

In addition, these respective pressures will be immediately communicated to the ends of piston 24 through channels 142 and 143 which are now connected through the selector valve to channels 195 and 191 respectively. It should be noted that the unit pressure in channel 195 is still lower than the unit pressure in channel 191 but the lower unit pressure multiplied by the larger area of the lower end of piston 24 will be greater than the higher unit pressure multiplied by the smaller area of the upper side of piston 24, thus producing a downward resultant which will cause downward movement of the cutter slide 22.

Thus, the operator establishes contact of the tracer with the pattern by means of the manual servo-control and when this contact has been made and the tracer deflected to effect shifting of the selector valve the control of the vertical slide 22 is automatically taken away from the operator and assumed by the tracer. At the same time, in order to protect the servo-mechanism, means have been provided for automatically disconnecting the half-nut 162 from the servo-screw 161 so that continued rotation of the screw will produce no effect.

This automatic disconnection is accomplished by providing the selector valve with a pressure port 197 which is supplied from the pump channel 34 and this port is connected when the selector valve is shifted to the left to port 198 whereby the pressure fluid will flow through channel 199 and ball check valve 200 to cylinder 201 containing piston 202. Actuation of the piston will rotate the half-nut 162 out of engagement with the servo-screw, as shown in Figure 9, against the pressure of spring 203 which will be further compressed upon actuation of the piston. When the selector valve returns to its normal position the port 198 is connected to an exhaust port 204 but the check valve 200 will prevent the fluid in cylinder 201 from escaping through this path. A resistance coil 205 is, therefore, connected through branch 206 to the portion 207 of the channel between the check valve 200 and the cylinder 201. The spring 203, therefore, acts to force the piston 202 backwards, compressing the fluid and forcing it through the resistance 205.

After the tracer has assumed control and the automatic downward movement of the vertical slide 22 starts the movement will continue until the tracer has been deflected sufficiently to create equal resultant pressures in both ends of cylinder 23. Equilibrium will then be established and the slide will stop.

The tracer is now in a condition to be responsive to variations in the contour of its associated pattern, whereby eminences on the pattern will produce an upward movement and depressions in the pattern will produce a downward movement.

Since the operator, due to focusing his attention on the vertical tracer while adjusting the vertical slide, might effect collision of the other tracer 61 with some object, safety means have been provided whereby abnormal end pressure on the tracer 61 will cause automatic disengagement of the half-nut 162 from the servo-screw. This means comprises a valve plunger 208 which is slidably mounted in the upper end of the tracer housing 53 and held in engagement with the upper end of the tracer 61 by a spring 209. As shown in Figure 12, this plunger has an annular groove 210 which controls the connection between a pressure port 211 and port 212. The valve is normally in a position that these ports are disconnected but when the plunger is shifted upward to interconnect these ports the pressure fluid will flow through branch line 213 to channels 206 and 207 and thereby to cylinder 201.

The resistance coil 205 will block the escape of fluid to the return channel 37 sufficiently to cause actuation of the piston 202 and the check valve 200 will prevent escape of fluid through the exhaust port 204 should the selector valve be in a right hand position. It should now be evident that means have been provided in association with each tracer and independently operable by the respective tracers to render the manual control means ineffective upon a predetermined amount of deflection of either tracer.

There has thus been provided an improved dual tracer control contouring machine which by the use of dual patterns properly contoured will control simultaneously three-directional relative movement between a cutter and work piece.

What is claimed is:

1. In a contouring machine having a pair of supports, one of which is adapted to carry a work piece, means for mounting said supports for movement in horizontal planes, and a tool support carried by one of said pairs of supports for movement perpendicular to said planes, the combination of power operable means for effecting relative movement between said supports in a horizontal plane, additional power operable means for effecting movement of the tool support, and control means for said power operable means including a first tracer for determining the direction of relative movement between the work support and tool support in a horizontal plane, and a second tracer for controlling the direction of relative movement between the work support and tool support in a vertical plane.

2. In a contouring machine having a tool support and a work support, the combination of power operable means for effecting relative movement between the supports in a given plane, power operable means for effecting relative movement between the supports perpendicular to said plane, means for governing the respective power operable means including a first tracer for controlling the direction of movement in the given plane, and a second tracer for controlling the direction of relative movement perpendicular to said plane.

3. In a contouring machine having a tool support, a work support and means on one of said supports for mounting a pair of patterns, one of which is outlined to determine the contour in a horizontal plane and the other of which is outlined to determine the contour in a vertical plane, the combination of power operable means for effecting relative movement between the supports in a horizontal plane, power operable means for effecting relative movement between the supports in a vertical plane, a pair of tracers mounted on one of said supports for cooperating with the patterns carried by the other support, said tracers being supported in parallel relation to the tool axis, means controlled by one of said tracers for governing operation of the first-named power operable means, and means controlled by the other tracer for governing operation of the second-named power operable means.

4. In a pattern controlled machine tool, the combination with a work support and a tool support, one of said supports being equipped with a tracer and the other being equipped with means to hold a pattern in cooperative relation to the tracer, of fluid operable means for effecting relative movement between the supports in one plane, means controlled by the tracer for governing said movement, means to guide one of said supports for movement perpendicular to the said plane, fluid operable means for governing said last-named movement and an additional tracer and pattern for controlling operation of said last-named fluid operable means.

5. In a pattern controlled milling machine, the combination with a tool support and a work support, of fluid operable means for effecting relative movement between the supports in one plane, a tracer mounted on one of said supports and adapted to cooperate with a pattern mounted on the other support, means controlled by the tracer for determining the resultant direction of relative movement between the supports, additional fluid operable means for effecting relative movement between the supports perpendicular to said plane, a second tracer carried by one of said supports for cooperation with a second pattern carried by the other support, and means controlled by the second tracer for governing operation of said additional fluid operable means concurrently during relative movement between the supports in said plane.

6. In a pattern controlled milling machine having a work support and a tool support, the combination of a fluid operable motor for effecting relative movement between the supports, a tracer, a tracer controlled valve, control channels connecting said valve to said motor, and means connecting said channels to opposite ends of said valve whereby unequal pressures in said channels will react to centralize the valve and prevent inadvertent creeping of the slide when the tracer is free.

7. In a contouring machine, the combination of a work support, a tool support, manually operable means for feeding one of said supports toward and from the other support, a pair of tracers carried by one of said supports for engaging separate patterns carried by the other support, fluid operable means for rendering said manually operable means ineffective, and means in each tracer responsive to deflection thereof for connecting a source of fluid pressure to said fluid operable means.

8. In a milling machine having a work support and a tool support, the combination with fluid operable means for effecting relative movement between the supports, of a valve, a tracer pivotally attached at one end of one said supports for lateral deflection to shift the valve and control the flow of fluid pressure to said fluid operable means, means surrounding the tracer for controlling the amount of deflection thereof and thus the rate of said relative movement including a sleeve mounted on said tracer and having a tapered portion, the tracer support having a bore formed therein, means to force the tapered portion of the sleeve into said bore for centralizing the tracer, and means to adjust the sleeve to control the amount of tracer deflection.

9. In a milling machine having a work support and a tool support, the combination with fluid operable means for effecting relative movement between the supports, of a pivotally mounted tracer on one of said supports deflectible to control the flow of fluid pressure to said fluid operable means, means for controlling the amount of tracer deflection and thereby the rate of relative movement between the support including a sleeve co-axial of the tracer and having a tapered portion, the support for the tracer having a bore formed therein for receiving said tapered portion, and means threaded on the tracer for adjusting said sleeve to produce a predetermined clearance between the tapered portion and the bore to determine the amount of tracer deflection and thereby the rate of said relative movement.

10. In a milling machine having a work support and a tool support, the combination with fluid operable means for effecting relative movement between the supports, of a pivotally mounted tracer on one of said supports deflectible to control the flow of fluid pressure to said fluid operable means, means for controlling the amount of tracer deflection and thereby the rate of relative movement between th supports including a sleeve co-axial of the tracer and having a tapered portion, the support for the tracer having a bore formed therein for receiving said tapered portion, means threaded on the tracer for adjusting said sleeve to produce a predetermined clearance between the tapered portion and the bore to determine the maximum amount of pressure deflection and thereby the rate of said relative movement, and manual means operable at will to effect a further shifting of said sleeve to effect a rapid traverse movement between said supports.

11. In a pattern controlled machine tool having a work support and a tool support, the combination with fluid operable means for effecting relative movement between the supports, of a deflectible tracer, the amount of deflection of said tracer controlling the rate of fluid flow to said fluid operable means and thereby the rate of said movement, means for controlling the amount of tracer deflection including a sleeve co-axial with the tracer, said sleeve having an external taper cooperating with a bore formed in the tracer support, positively positionable means carried by the tracer for shifting said sleeve for determining the amount of clearance between said tapered portion and said bore, and resiliently operable means for deflecting the tracer the amount of said clearance.

12. In a pattern controlled machine tool having a work support and a tool support, the combination with fluid operable means for effecting relative movement between the supports, of a deflectible tracer, the amount of deflection of said tracer controlling the rate of fluid flow to said fluid operable means and thereby the rate of said movement, means for controlling the amount of tracer deflection including a sleeve mounted on the tracer, said sleeve having an external taper cooperating with a bore formed in the tracer support, positively positionable means carried by the tracer for shifting said sleeve for determining the amount of clearance between said tapered portion and said bore, resiliently operable means for deflecting the tracer the amount of said clearance to produce relative movement between the cutter and work at a predetermined rate, and independently operable means for controlling the movement of the cutter toward and from the work during said relative movement.

13. In a mechanism for removing material to form a work cavity in accordance with a pattern, the combination of a work support, a tool support, manually operable means to feed the tool support toward the work support, power operable means for effecting relative movement between the supports, a tracer control mechanism for said power operable means, a masking bar adapted to be superimposed over the pattern, means to support the bar for lateral indexing, means to urge the tracer into engagement with said bar to effect operation of said power operable means, and means to index the bar and change the angle of urge on the tracer to reverse the direction of movement between said supports.

14. In a pattern controlled machine tool having a power operable tool support and a power operable work support mounted for three-directional relative movement, the combination of control means therefor including a first tracer controlled mechanism for governing two directional relative movement between said supports and a second tracer control mechanism for governing the direction of relative movement in the third direction.

15. In a pattern controlled machine tool having a work support and a tool support, the combination of power operable means for effecting relative movement between the supports, of control means therefor including a universally deflectible tracer, the plane of deflection of which determines the direction of relative movement between the supports and the amount of deflection determining the rate of said movement, rate determining means adapted to be set to limit the amount of tracer deflection, means to determine the direction of tracer deflection, and independently operable means to increase the limit of tracer deflection without effecting said rate determining means to produce a rapid traverse movement between the slides.

16. In a pattern controlled machine tool having a tool support and a work support, one of which is adapted to serve as a tracer support and the other as a pattern support, the combination of control means for governing relative movement between the supports in a plurality of directions including a tracer pivotally connected at one end to the tracer support, an indexible ring mounted on the tracer support intermediate the ends of the tracer and surrounding the same, a tracer deflecting plunger mounted on the ring for axial movement perpendicular to the tracer axis, means for indexing the ring to a limited number of positions throughout 360 degrees to change the plane of movement of said plunger, and means for imparting a limited circumferential movement of the plunger about the tracer and relative to said ring to obtain minute variations in the position of the plunger.

17. In a pattern controlled machine tool having a cutter support and a work support and power operable means for effecting relative movement between the supports, the combination of control means for said power operable means including a tracer mounted on one of said supports for cooperation with a pattern mounted on the other support, said tracer being pivotally connected at one end to its support for universal lateral oscillation, means intermediate the ends of the tracer for imparting a limited lateral deflection to the tracer, means responsive to any deflection of the tracer for causing relative movement between the supports, means for rotatably positioning the tracer deflecting means about the tracer for determining the radial plane of deflection thereof, and means responsive to the plane of tracer deflection for determining the direction of relative movement between the supports.

18. In a pattern controlled machine tool having a cutter support and a work support and power operable means for effecting relative movement between the supports, the combination of control means for said power operable means including a tracer adapted to be mounted on one of said supports for cooperation with a pattern carried by the other support, means supporting a plunger in pendulum fashion to the tracer support for universal lateral deflection, means for holding the plunger against deflection to prevent movement of said supports, said means being releasable to permit limited lateral movement of the tracer to effect relative movement between the supports, a plunger supported for movement perpendicular to the tracer to effect deflection thereof when said first-named means are released, means to orient the plunger about the tracer to cause the plane of deflection thereof to intersect the periphery of the pattern, and means to render said plunger ineffective whereby the tracer may be manually controlled.

19. In a milling machine having a tool support and a work support mounted for three-directional relative movement, the combination of separate power operable means for effecting each of said movements, a manually operable tracer supported for universal movement in a plane, means operatively connected to the tracer for controlling operation of two of said power operable means and thereby universal relative movement between the tool and work in said plane, an automatically operable tracer supported for engagement with a separate pattern, means coupling the tracer for automatic control of the third power operable means whereby during manually controlled tracing in the first plane relative movement between the tool and work perpendicular to said plane will be automatically controlled by said second tracer.

20. In a die-sinking machine having a tool holder and a work holder supported for relative movement in three directions and separate power operable means for effecting movement in the respective directions, the combination of control means therefor including a first tracer mechanism operatively connected for joint or several control of a pair of said fluid operable means whereby universal movement between the tool and work in a given plane may be effected in accordance with the outline of a pattern lying in said plane, a second tracer coupled for automatic control of the third power operable means, means normally disconnecting the second tracer from the third power operable means, said second tracer being adapted to cooperate with a second pattern outlined to control movement between the tool and work in a direction perpendicular to said plane, manually operable means for controlling said third power operable means and thus relative movement between the tool and work in a direction to effect engagement of said second tracer with its cooperating pattern, and means responsive to engagement of the second tracer with its pattern for effecting automatic connection of the second tracer with said third power operable means whereby movements between the tool and work in a direction perpendicular to said plane may be automatically controlled during manual manipulation of the first-named tracer in controlling relative movement between the tool and work in said plane.

21. In a die-sinking machine for forming cavities in a die block, the combination of a tool support and a work support for holding said die block, the combination of means mounted on said work support for supporting a first pattern having a profile corresponding to the outline of said cavity in a cross sectional plane and a second pattern shaped to conform to the contour of the bottom of said cavity, a manually operable tracer supported for engagement with the first pattern, power operable means controlled thereby for governing universal movement between the tool and work support in the plane of said pattern, a second tracer cooperating with the second pattern, power operable means controlled thereby for governing movement between the tool and work support in a depthwise direction, manually operable means for controlling relative adjustment to effect engagement of the second tracer with its pattern, and means responsive to said engagement for automatically coupling the second tracer for control of its power operable means whereby during manual manipulation of the first tracer the second tracer will automatically control movement between the tool and work in a third direction.

ERWIN G. ROEHM.